United States Patent [19]
Lin et al.

[11] Patent Number: 5,531,851
[45] Date of Patent: Jul. 2, 1996

[54] PROCESS FOR MAKING METALLIZED PLASTIC MOLDING PELLETS FOR SHIELDING ELECTROMAGNETIC INTERFERENCE

[76] Inventors: Ching-Bin Lin; Tung-Han Chuang, both of c/o Hung Hsing Patent Service Center P.O. Box 55-1670, Taipei, Taiwan

[21] Appl. No.: 431,137

[22] Filed: Apr. 28, 1995

[51] Int. Cl.⁶ ............................. B29B 9/06; B29B 11/16; B23B 31/18
[52] U.S. Cl. ................... 156/180; 156/245; 156/256; 156/259; 156/433; 156/441; 156/166; 264/136; 264/147
[58] Field of Search ........................... 156/166, 180, 156/259, 433, 441, 245, 242, 256, 264; 264/136, 134, 141, 147, 152

[56] References Cited

U.S. PATENT DOCUMENTS 4,738,734 4/1988 Ziemek ..................... 156/259 X
4,960,642 10/1990 Kosuga et al. .................... 428/407
5,176,775 1/1993 Montsinger ................... 156/180 X
5,268,050 12/1993 Azari ............................. 156/180

*Primary Examiner*—Jeff H. Aftergut

[57] ABSTRACT

A process for making metallized plastic molding pellets comprising: first metallizing a laminated plastic sheet by sandwiching an electrically conductive metal foil in between two plastic films; secondly slicing the metallized laminated plastic sheet into a plurality of metallized plastic strips; thirdly wetting and binding the metallized plastic strips, which are radially arranged, with a thermoplastic resin matrix to form a metallized plastic bar by pultrusion processing; and finally cutting the pultruded metallized bar to obtain homogeneously metallized plastic pellets for making effective EMI shields.

8 Claims, 3 Drawing Sheets

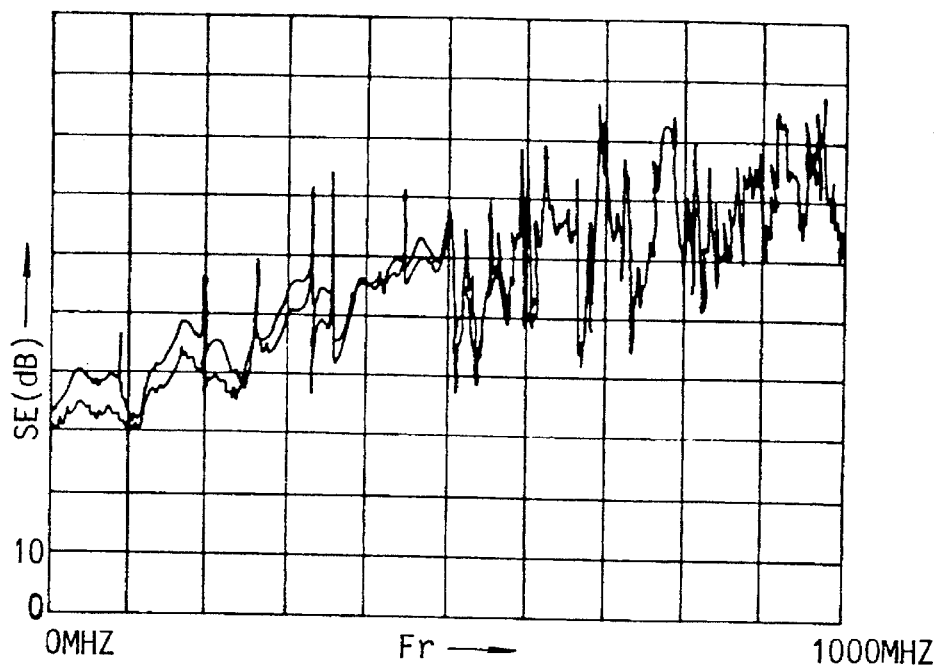
F I G. 5
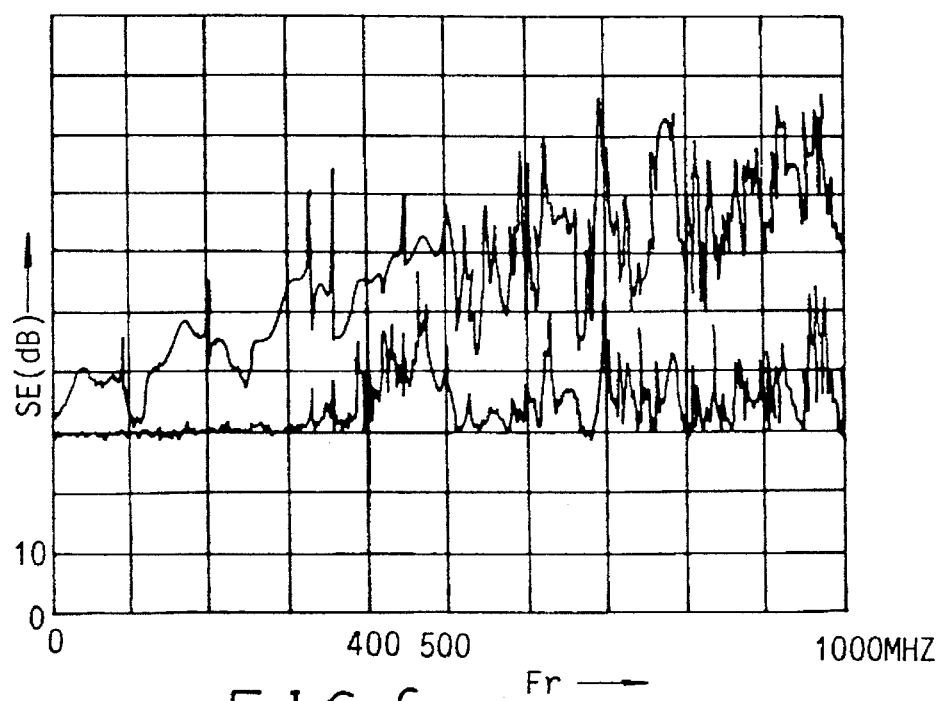
F I G. 6

PROCESS FOR MAKING METALLIZED PLASTIC MOLDING PELLETS FOR SHIELDING ELECTROMAGNETIC INTERFERENCE

BACKGROUND OF THE INVENTION

There are many methods provided for shielding electromagnetic interference (EMI). However, shields made from metal are cumbersome, heavy and complex in forms to thereby be unsuitable for electronic industries. The metal coating on the surface of plastic article for making EMI shield may be easily scratched to partially lose its shielding efficiency. Once the scratched scraps, which are electrically conductive, drop onto a printed circuit board of an electronic product, a short-circuiting may be caused to deteriorate the electronic product. Meanwhile, the metal coating or plating may increase the problems of environmental protection.

Recently, several plastic molding processes were disclosed by incorporating metal materials into the resin compositions for making EMI shields.

U.S. Pat. No. 4,474,685 entitled "High Performance Molding Compounds for Shielding Electromagnetic Interference" to Myron C. Annis discloses a molding composition comprising a thermosetting resin binder and an electrically conductive filler comprising particles of carbon black, graphite and a conductive metal for achieving a shielding effect to the emissions of electromagnetic interference.

However, when blending the resin with the particulate fillers for molding processing for making EMI shields, the particulate fillers may be easily clustered to cause unhomogeneous dispersion of the electrically conductive fillers in the resin matrix, thereby influencing the shielding effectiveness of the molded products.

Other fillers such as fiber fillers and flake fillers may also be considered to substitute the particulate fillers as above-mentioned.

However, the process by using fiber fillers is costly and uneconomic for a commercial production.

The flake fillers, when used in the processing steps of resin blending, pelleting and injection molding, may be easily broken to reduce the electrical conductivity, thereby possibly decreasing the EMI shielding effect of the molded product.

The present inventors have found the drawbacks of the conventional methods for making EMI shields and invented this process for making homogeneously metallized plastic pellets for molding effective EMI shields.

SUMMARY OF THE INVENTION

The object of the present invention is to provide a process for making metallized plastic molding pellets comprising: first metallizing a laminated plastic sheet by sandwiching an electrically conductive metal foil in between two plastic films; secondly slicing the metallized laminated plastic sheet into a plurality of metallized plastic strips; thirdly wetting and binding the metallized plastic strips, which have been radially arranged, with a thermoplastic resin matrix to form a metallized plastic bar by pultrusion processing; and finally cutting the pultruded metallized bar to obtain homogeneously metallized plastic pellets for making effective EMI shields.

BRIEF DESCRIPTION OF THE DRAWINGS

FIG. 5 shows two curves for determining the shielding effectiveness (SE) of an ABS plastic material without being metallized versus frequency (Fr).

FIG. 6 shows two curves for determining the shielding effectiveness (SE) of the shield made by the present invention versus frequency (Fr).

DETAILED DESCRIPTION

Figure 1:
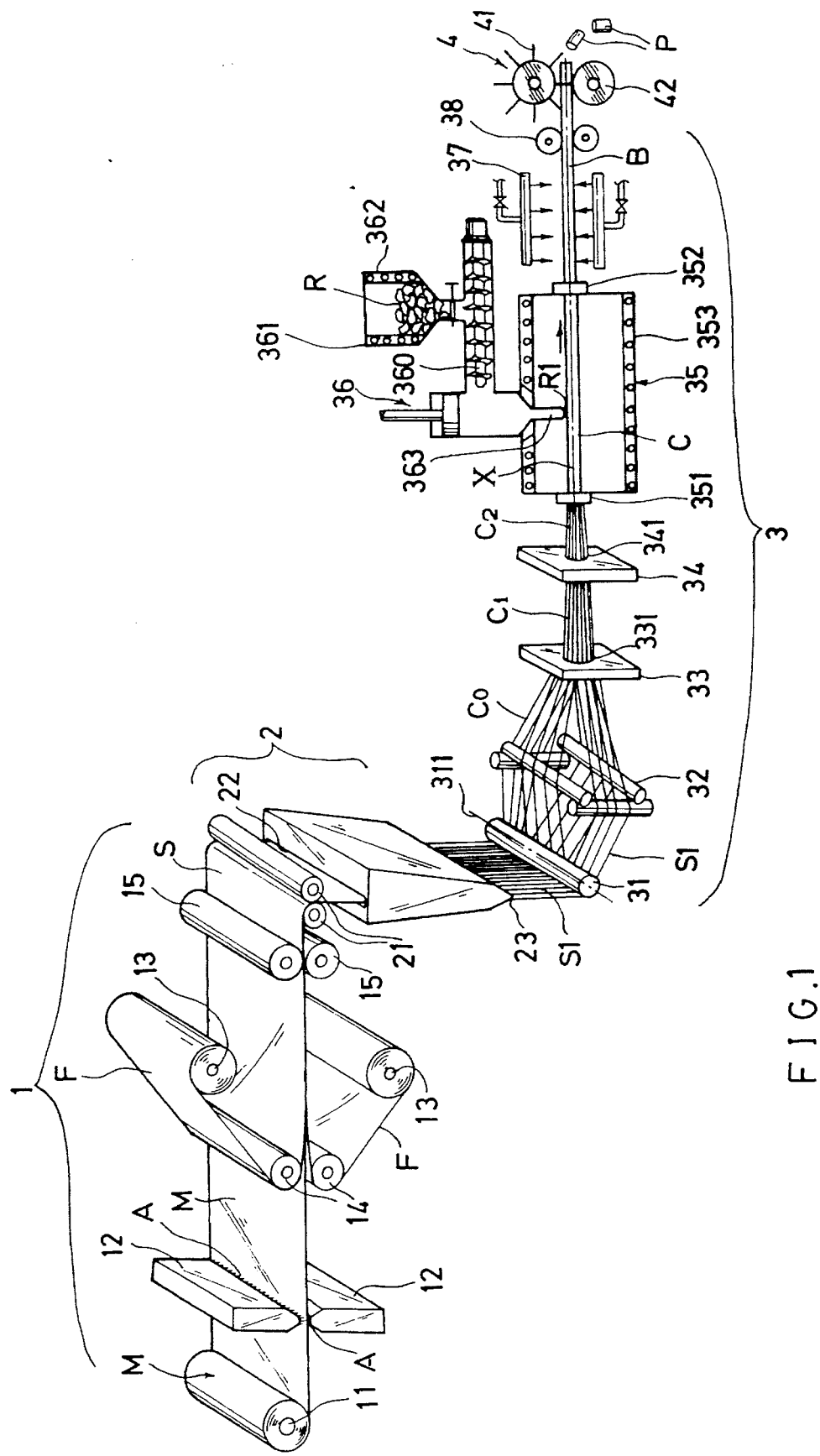
FIG. 1 is a flow sheet diagram showing the process of the present invention.
Figure 2:
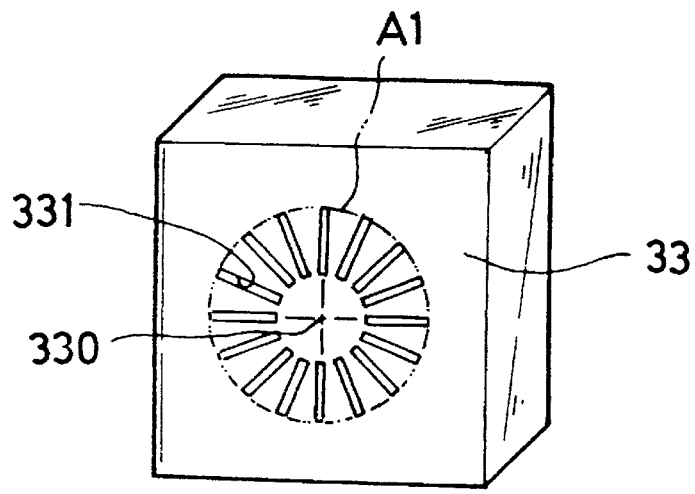
FIG. 2 is a perspective view of a first guiding mold of the present invention.
Figure 3:
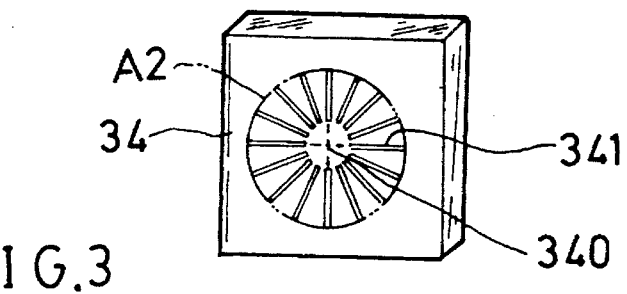
FIG. 3 is a perspective view of a second guiding mold of the present invention.

A process for making metallized plastic molding pellets in accordance with the present invention as shown in FIGS. 1–3 comprises: metallizing a laminated plastic sheet by sandwiching an electrically conductive metal foil M in between two thermoplastic plastic films F by a sheet metallizing means 1 to form a metallized laminated plastic sheet S; slicing the metallized laminated plastic sheet S by a slicing means 2 into a plurality of metallized plastic strips S1; wetting and binding the metallized plastic strips S1, as radially arranged, with a thermoplastic resin matrix R to form a metallized plastic bar B as pultruded and cooled by a pultrusion means 3; and cutting the pultruded metallized bar B by a cutting means 4 to obtain a plurality of metallized plastic pellets P.

The sheet metallizing means 1 includes: a metal-foil spool 11 for unrolling a metal foil M such as an aluminum foil, a pair of agent applicators 12 disposed on two opposite surfaces of the metal foil M for homogeneously coating a coupling agent A on the two opposite surfaces of the metal foil M, a pair of plastic-film spools 13 unrolling two plastic films F each plastic film F guided by a film guiding roller 14 adjacent to the metal foil M for sandwiching the metal foil M in between the two plastic films F as bonded by the coupling agent A to form a metallized laminated plastic sheet S, and a pair of hot-press rollers 15 operatively pulling and rotatably compacting the laminated plastic sheet S having the metal foil M stably sandwiched and metallized in the two plastic films F.

The thermoplastic plastic film F may be selected from: Acrylonitrile-butadiene-styrene (ABS) copolymer, Polyethylene (PE) and other suitable thermoplastic plastic materials. The meterial of film F may be the same material of resin matrix R or be compatible with the resin matrix.

The electrically conductive metal foil M may be selected from: aluminum, copper, silver, nickel and other electrically conductive metals. The coupling agent A may be selected from: titanium coupling agent, zirconium-aluminum coupling agent such as Zircoaluminate, and other suitable coupling agents.

The slicing means 2 includes: at least a slicing guiding roller 21 for guiding the metallized laminated plastic sheet S from the sheet metallizing means 1 to a feed port 22 of the slicing means 2 to be sliced in the slicing means 2, and a discharge port 23 formed on a downstream side of the slicing means 2 for discharging a plurality of metallized plastic strips S1 having a generally linear arrangement from a side view thereof.

The pultrusion means 3 includes: a feeding roller 31 having a feeding roller axis 311 generally perpendicular to the plurality of metallized plastic strips S1 delivered from the slicing means 2 for juxtapositionally guiding the plastic strips S1 towards an orienting roller set 32 consisting of at least four orienting rollers rotatably mounted on a frame (not shown) to be generally rectangular or parallelogram shaped for divergently developing the plurality of plastic strips S1 from the feeding roller 31 to form a cross section of generally rectangular shape Co; a first guiding mold 33 having a plurality of first radial apertures 331 radially slotted in the first guiding mold 33 to define a circular area A1 for convergently guiding the plurality of plastic strips S1 having rectangular shape Co to be a first cone-shaped core member C1 from the orienting roller set 32; a second guiding mold 34 juxtapositionally positioned after the first guiding mold 33 for continuously converging the plurality of plastic strips S1 through a plurality of second radial apertures 341 radially slotted in the second guiding mold 34 with the second radial apertures 341 defining a circular area A2 smaller than the area A1 of the first mold 33 for forming a second cone-shaped core member C2 smaller than the first cone-shaped core member C1; a pultruder 35 having an inlet die 351 and an outlet die 352 disposed on two opposite end portions of the pultruder 35 to be aligned with each center 330, 340 of the first and second guiding molds 33, 34, with the inlet die 351 radially formed with a plurality of slits (not shown) in the inlet die 351 for converging the second cone-shaped core member C2 from the second mold 34 to form a cylindrical core member C in the pultruder 35; and a heater 353 mounted in the pultruder 35 for heating the dies 351, 352 and keeping a constant temperature in the pultruder for melting a resin matrix R delivered from a resin feeder 36 mounted on the pultruder 35 for wetting the cylindrical core member C as convergently guided by the inlet die 351 to form a metallized plastic bar B as released from the outlet die 352; a cooling means 37 for cooling and curing the metallized plastic bar B as released from a central opening of the outlet die 352 of the pultruder 35; and a pair of puller rollers 38 positioned at a downstream of the cooling means 37 for tensioning and pulling the metallized plastic bar B to the cutting means 4.

Figure 4:
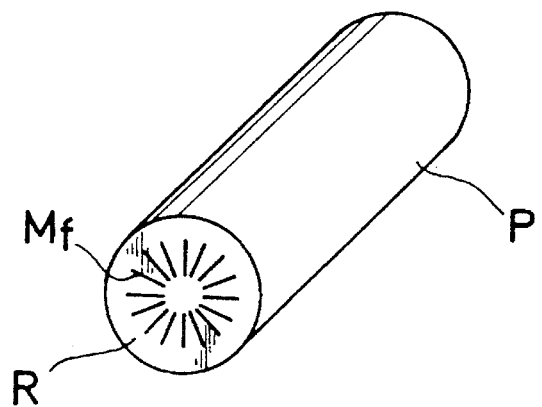
FIG. 4 shows a pultruded pellet in accordance with the present invention.

The cutting means 4 includes: a cutter 41 and an anvil roller 42 disposed on two opposite sides of the metallized plastic bar B for cutting the bar B to be a plurality of metallized pellets P of predetermined length as shown in FIG. 4.

Each guiding mold 33, 34 may be made of Teflon or other suitable materials.

The pultruder 35 has each die center of the inlet die 351 and the outlet die 352 aligned with a longitudinal axis X of the cylindrical core member C passing through the pultruder 35 and aligned with each center 330, 340 of the first and second guiding molds 33, 34.

The resin feeder 36 includes: a hopper 361 surrounded with a pre-heater 362 for charging and preheating a resin matrix R which is loaded into a screw extruder 360, and a resin applicator 363 for receiving the resin from the extruder 360 for delivering a molten resin R1 as heated in the pultruder 35 for wetting and binding the cylindrical core member C consisting of a plurality of metallized plastic strips which are radially arranged to be released from the outlet die 352 for cooling and curing by the cooling means 37.

The cooling means 37 includes: a plurality of spray nozzles for spraying cooling water onto the metallized plastic bar B, as pulled by the puller rollers 38 made of rubber.

The preferred examples for performing the process of the present invention are described hereinafter:

EXAMPLE 1

By using the method and process equipments of the present invention as above-mentioned, metallized plastic molding pellets may be made by coating Titanium coupling agent, 1.2 phf (parts per one hundred parts of resin) of Neoalkoxy, Tri(dioctylpyrophosphato) Titanate produced by Kearich Petrochemicals Inc., U.S.A. (Lica 38), having a formula of:

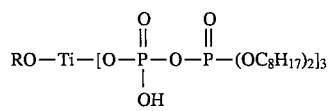

on two opposite surfaces of the aluminum foil 20 μm thickness; rotatably compacting and sandwiching the aluminum foil in between two 40 μm ABS plastic films at 105° C. to form metallized plastic laminated sheet; slicing the laminated sheet to be 16 metallized plastic strips each strip having a width of 1 mm; gradually converging the 16 strips through the two guiding molds 33, 34 for forming a core member having the metallized strips radially arranged in the core member; wetting and binding the core member in the pultruder 35 by a molten ABS resin matrix at 220°–230° C. to form a metallized plastic bar when keeping the pultruder at a constant temperature of 230° C.; pultruding the plastic bar through the central opening of the outlet die 352 of 3 mm diameter; cooling and hardening the pultruded plastic bar with 25° C. water sprayed from the nozzles of cooling means 37; and cutting the bar to be pellets P each having a length of 5 mm by a cylindrically shaped roller cutter 41. The metallized plastic strips substantially contain a plurality of metal thin pieces Mf radially distributed in the resin matrix about a longitudinal axis in each pellet P.

The pellets thus produced may be provided for molding electronic or computer products by plastic molding processes for shielding electromagnetic interference.

EXAMPLE 2

The pellets obtained from Example 1 is provided for forming testing specimens by plastic molding process for performing test of electromagnetic shielding effectiveness. The test method of Dual Chamber of ASTM ES7-83 may be applied for testing the shielding effectiveness of the molded product of the present invention to obtain the shielding effectiveness (SE) in decibels between the two curves as shown in FIG. 6 versus the frequency (Fr) from 0 to 1000 MHz in comparison with a control test by measuring the shielding effectiveness (SE) of an ABS plastic molding material without being metallized versus frequency (Fr) as shown in FIG. 5.

Several setting values and test data are summarized as follows:
1. Distance between antenna and the test specimen: 5 mm
2. Spectrum Analyzer:
   Frequency range: 30 MHz–1.5 GHz
   BW=300 KHz
3. Tracking Generator:
   0 dBm–10 dBm; 30 MHz–1.5 GHz
4. Amplifier:
   100 KHz–1.3 GHz
   Gain 226 dB
5. TEM Cell:
   DC-200 MHz
6. Dummy Load:

50 ohm, 500 W
7. Close Field Probe:
Pmax=0.5 W
Rdc=18.97 ohm

As shown in FIG. 5, the ABS plastic product without being metallized substantially shows no shielding effect.

Comparatively, the metallized molding product of the present invention indicates an average dB attenuation about 30–35 decibels between the frequency range of 0–1000 MHz (FIG. 6).

Accordingly, the present invention may impart a shielding effect of a metallized plastic product for shielding electromagnetic interference.

Since the electrically conductive metal thin pieces Mf have been firmly radially disposed in each plastic pellet P, the metal pieces will be homogeneously dispersed in the resin matrix phase during the molding processing without being clustered or broken so as to ensure a better shielding effectiveness of a molded product by the present invention.

As shown in FIG. 4, the length of each metal thin piece Mf, the density or number of the metal thin pieces Mf distributed in the resin matrix R may be varied or adjusted depending upon the practical requirement, such as a commercial rating of EMI shielding effectiveness.

The present invention may be modified without departing from the spirit and scope of this invention.

We claim:

1. A process for making metallized plastic molding pellets comprising:
   a. sandwiching an electrically conductive metal foil in between two thermoplastic plastic films to form a metallized laminated plastic sheet by a sheet metallizing means;
   b. slicing the metallized laminated plastic sheet by a slicing means into a plurality of metallized plastic strips;
   c. radially arranging the metallized plastic strips in a pultrusion means, and wetting and binding the metallized plastic strips, which have been radially arranged, with a thermoplastic resin matrix in said pultrusion means to form a metallized plastic bar, and cooling said metallized plastic bar as pultruded from said pultrusion means; and
   d. cutting the metallized plastic bar by a cutting means to obtain a plurality of metallized plastic pellets each said pellet having a plurality of metal thin pieces radially disposed in the resin matrix about a longitudinal axis in each said pellet.

2. A process for making metallized plastic molding pellets according to claim 1, wherein said sheet metallizing means includes: a metal-foil spool for unrolling a metal foil prewound on said metal-foil spool, a pair of agent applicators disposed on two opposite surfaces of the metal foil for homogeneously coating a coupling agent on the two opposite surfaces of the metal foil, a pair of plastic-film spools for unrolling said two plastic films from said plastic-film spools each said plastic film guided by a film guiding roller adjacent to the metal foil for sandwiching the metal foil in between the two plastic films as bonded by the coupling agent to form a metallized laminated plastic sheet, and a pair of hot-press rollers operatively pulling and rotatably compacting the laminated plastic sheet having the metal foil stably sandwiched and metallized in the two plastic films.

3. A process for making metallized plastic molding pellets according to claim 1, wherein said slicing means includes: at least a slicing guiding roller for guiding the metallized laminated plastic sheet from the sheet metallizing means to a feed port of the slicing means to be sliced therein, and a discharge port formed on a downstream side of said slicing means for discharging a plurality of metallized plastic strips having a side view of generally linear arrangement.

4. A process for making metallized plastic molding pellets according to claim 1, wherein said pultrusion means includes: a feeding roller having a feeding roller axis generally perpendicular to said plurality of metallized plastic strips delivered from the slicing means for juxtapositionally guiding the plastic strips towards an orienting roller set consisting of at least four orienting rollers rotatably mounted on a frame to be generally rectangular shaped for divergently developing the plurality of plastic strips from the feeding roller to form a cross section of generally rectangular shape; a first guiding mold having a plurality of first radial apertures radially slotted in the first guiding mold to define a first circular area for convergently guiding the plurality of plastic strips having rectangular shape to be a first cone-shaped core member from the orienting roller set; a second guiding mold juxtapositionally positioned after the first guiding mold for continuously converging the plurality of plastic strips through a plurality of second radial apertures radially slotted in the second guiding mold with said second radial apertures defining a second circular area smaller than the first circular area of the first radial apertures in said first mold for forming a second cone-shaped core member smaller than the first cone-shaped core member; a pultruder having an inlet die and an outlet die disposed on two opposite end portions of the pultruder to be aligned with a center of each said first and said second guiding mold, with the inlet die radially formed with a plurality of slits in the inlet die for converging the second cone-shaped core member from the second mold to form a cylindrical core member in said pultruder; and a heater mounted in the pultruder for heating the inlet and outlet dies and keeping a constant temperature in the pultruder for melting a resin matrix delivered from a resin feeder mounted on the pultruder for wetting said cylindrical core member to form a metallized plastic bar as released from the outlet die; a cooling means for cooling and curing the metallized plastic bar as released from a central opening in the outlet die of the pultruder; and a pair of puller rollers positioned after the cooling means for tensioning and pulling the metallized plastic bar towards said cutting means.

5. A process for making metallized plastic molding pellets according to claim 1, wherein said cutting means includes: a cutter and an anvil roller rotatably disposed on two opposite sides of the metallized plastic bar for cutting the plastic bar to be a plurality of metallized pellets each said pellet having a predetermined length.

6. A process for making metallized plastic molding pellets according to claim 4, wherein said pultruder has a die center of each said inlet die and said outlet die aligned with a longitudinal axis of said cylindrical core member passing through the pultruder and aligned with each said center of the first and second guiding molds.

7. A process for making metallized plastic molding pellets according to claim 4, wherein said resin feeder includes: a hopper surrounded with a pre-heater for charging and pre-heating a resin matrix into a screw extruder, and a resin applicator connected with said screw extruder for receiving the resin from the extruder for delivering the resin as heated and melted in the pultruder for wetting and binding the cylindrical core member consisting of a plurality of metallized plastic strips, which are radially arranged, to form a metallized plastic bar to be released from the outlet die for a cooling and curing by the cooling means.

8. A process for making metallized plastic molding pellets according to claim 7, wherein said cooling means includes: a plurality of spray nozzles for spraying cooling water onto the metallized plastic bar.

* * * * *